A. K. MARTELL & E. MONHOF.
TRACTOR.
APPLICATION FILED JUNE 19, 1917.
1,272,287.
Patented July 9, 1918.
5 SHEETS—SHEET 1.
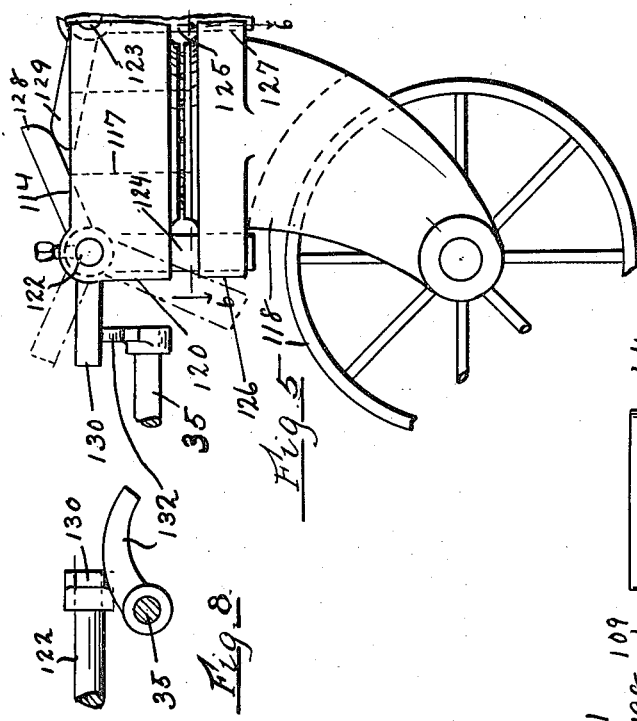
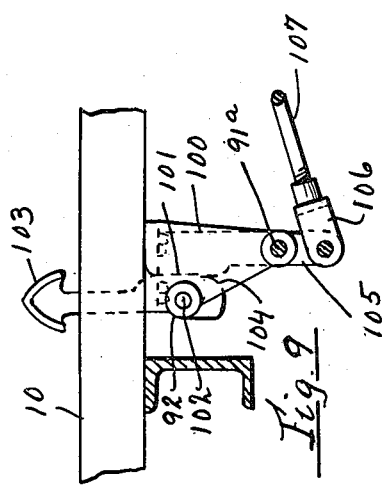
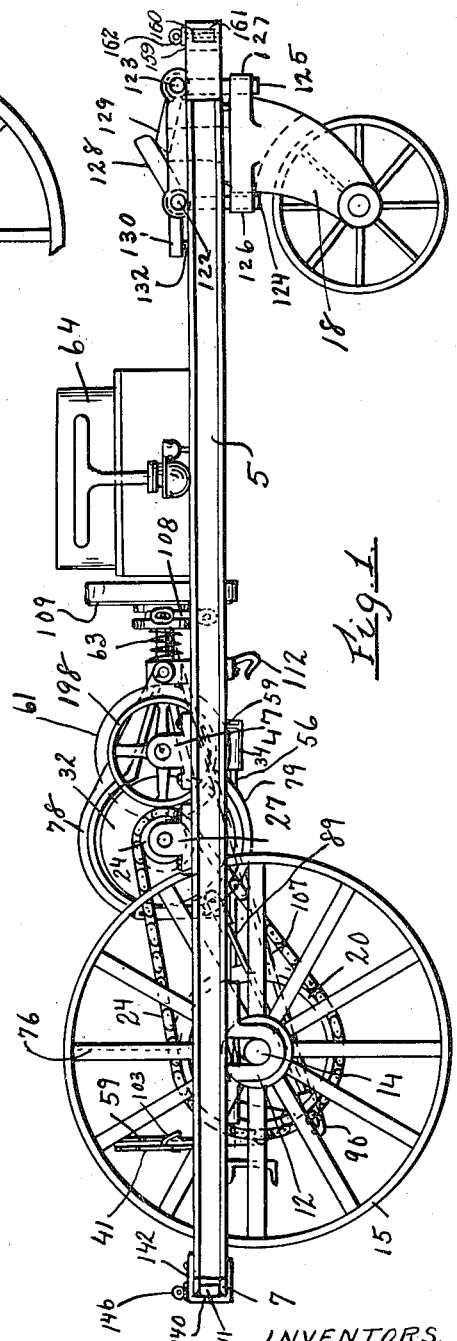
INVENTORS.
ANDREW K. MARTELL,
EMIL MONHOF
by Martell & Co
ATTORNEYS.

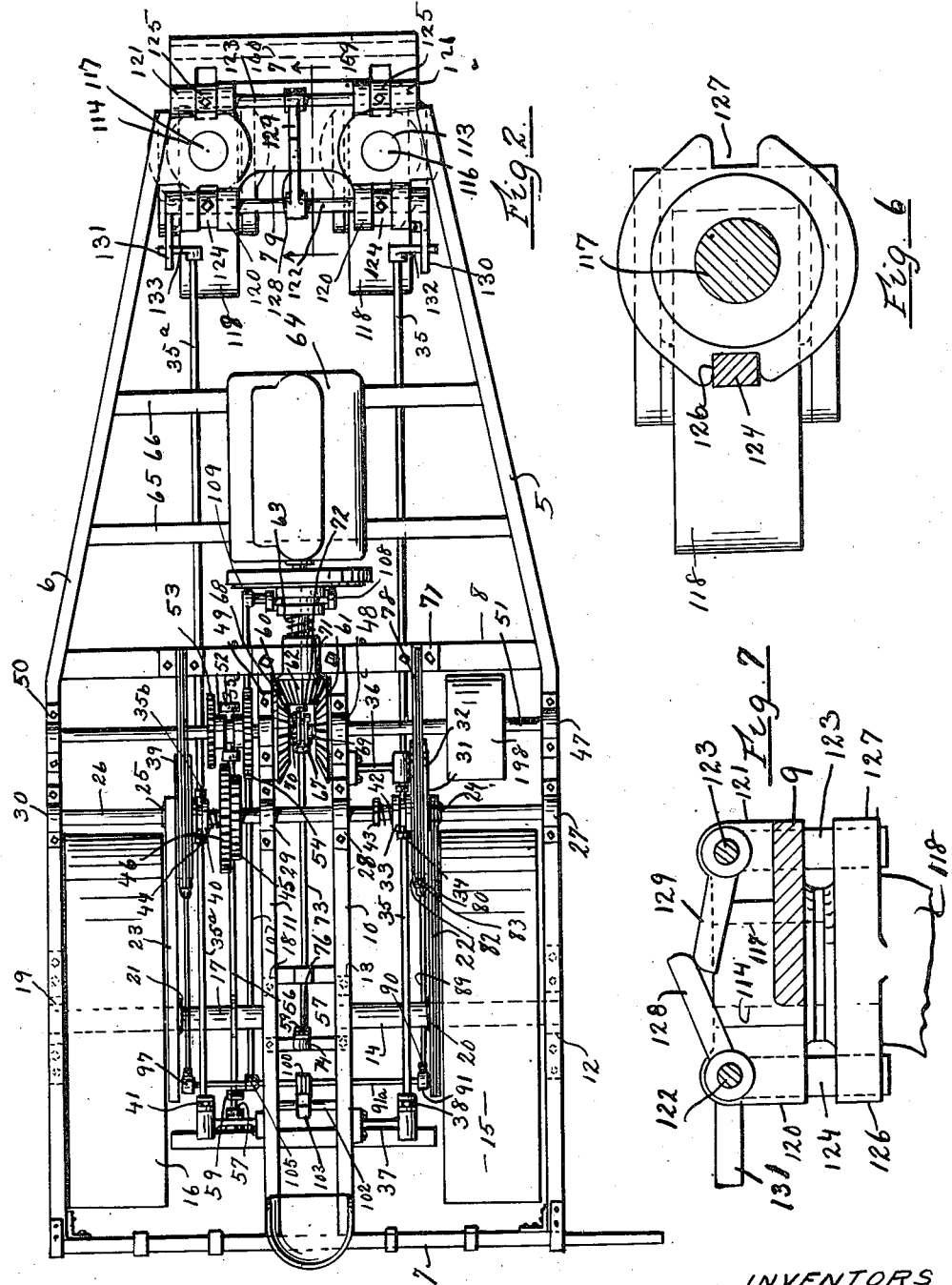

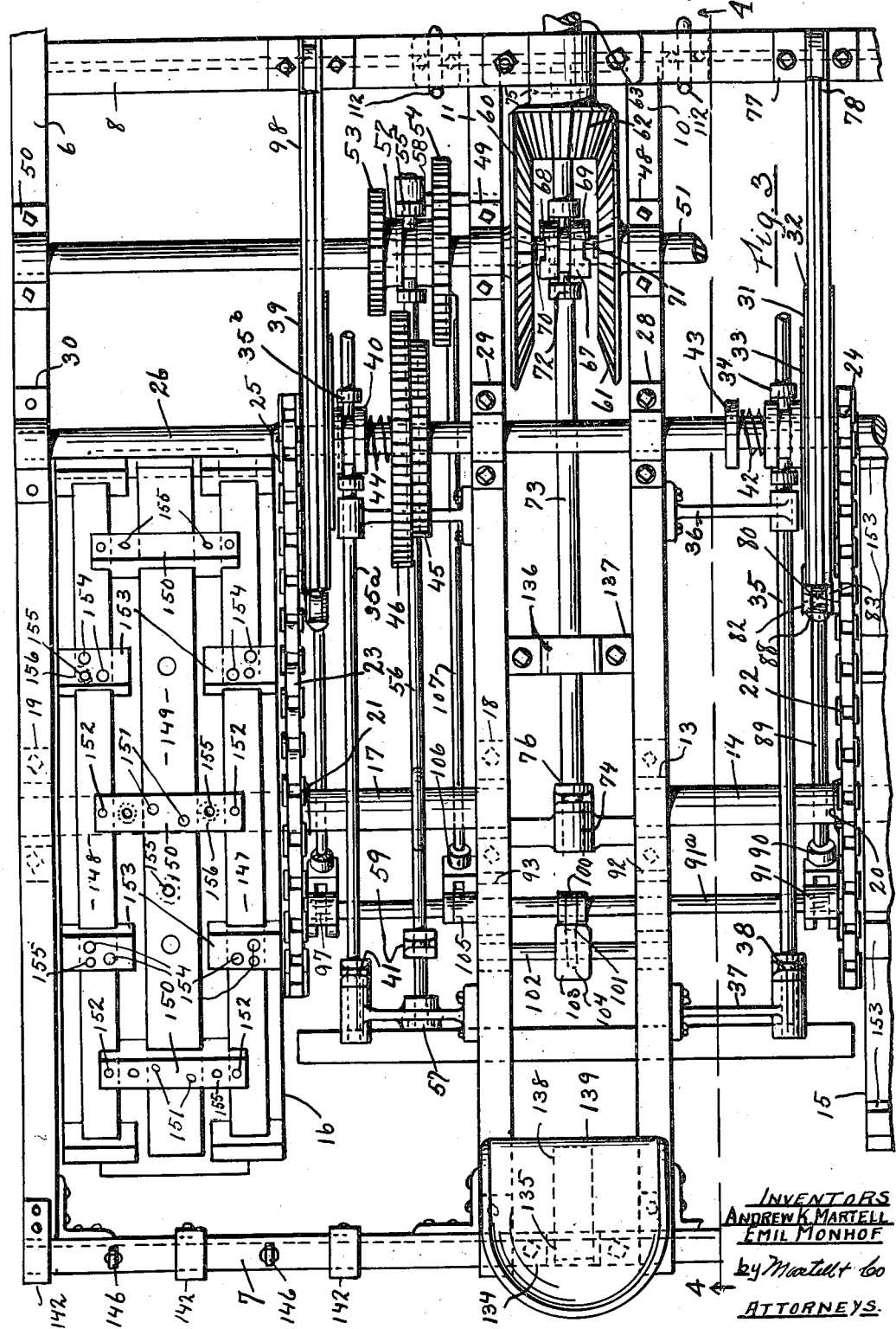

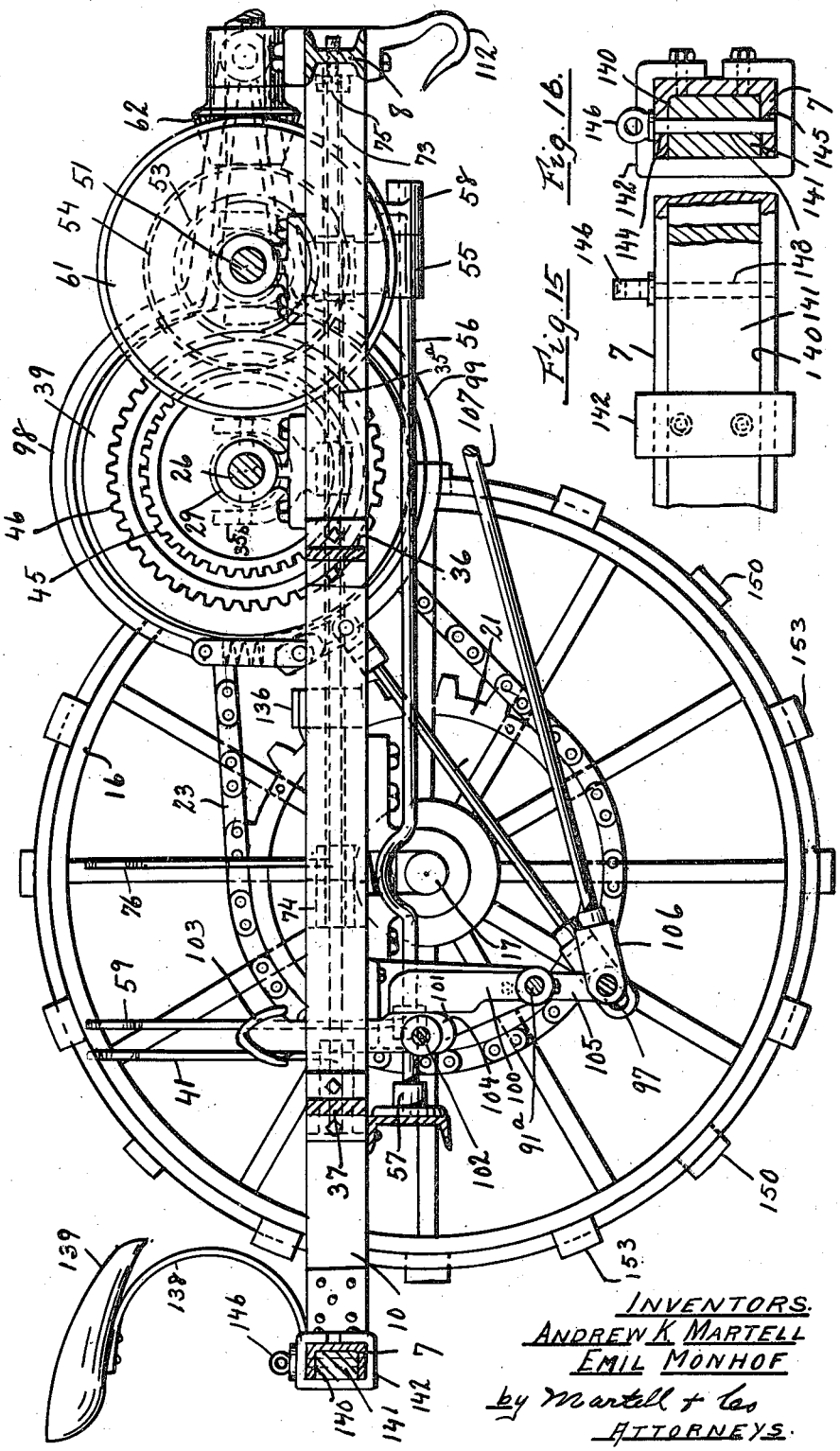

A. K. MARTELL & E. MONHOF.
TRACTOR.
APPLICATION FILED JUNE 19, 1917.

1,272,287.

Patented July 9, 1918.
5 SHEETS—SHEET 5.

INVENTORS.
ANDREW K. MARTELL
EMIL MONHOF
By Martell & Co
ATTORNEYS.

UNITED STATES PATENT OFFICE.

ANDREW K. MARTELL AND EMIL MONHOF, OF LOS ANGELES, CALIFORNIA.

TRACTOR.

1,272,287. Specification of Letters Patent. Patented July 9, 1918.

Application filed June 19, 1917. Serial No. 175,563.

*To all whom it may concern:*

Be it known that we, ANDREW K. MARTELL and EMIL MONHOF, citizens of the United States, residing at Los Angeles, in the county of Los Angeles and State of California, have invented certain new and useful Improvements in Tractors, of which the following is a specification.

Our invention relates primarily to a tractor for use in agricultural work although it is adapted for other uses and we do not limit ourselves to such use and the object thereof is to provide a tractor which will be cheap and simple in construction, simple and economical in operation, and which is equally applicable to agricultural or road work.

A further object is to provide a tractor which can be operated to travel with either end as the front end without any alteration of the construction thereof.

Another object is to provide a device of this character which can be easily and quickly adapted to suit the varying conditions of the ground upon which it is desired to have the same operate.

A still further object is to provide a tractor in which the number of operative parts is reduced to a minimum and in which the power plant may be disconnected therefrom and used to operate other machinery.

Another object is to provide in a tractor means for holding the travel of the tractor to a straight line and means whereby, upon the releasing of the holding means, the tractor may be caused to turn in any desired direction.

Another object is to provide novel means whereby the clutch and brake mechanism may be operated from either direction.

Other objects and advantages will appear hereinafter and while we have shown and will describe the preferred form of construction of our invention it will be understood that we do not limit ourselves thereto and that various changes and adaptations may be made therein without departing from the spirit of our invention.

In the drawings forming a part hereof:

Figure 1 is a side elevation of our tractor complete and ready for use.

Fig. 2 is a top plan of Fig. 1.

Fig. 3 is an enlarged top plan of the rear portion of our tractor, partly broken away, showing the controlling and operating devices.

Fig. 4 is a section on the line 4—4 of Fig. 3.

Fig. 5 is an enlarged detail of the steering wheel.

Fig. 6 is a section on the line 6—6 of Fig. 5.

Fig. 7 is a section on the line 7—7 of Fig. 2.

Fig. 8 is a detail of the steering wheel releasing devices.

Fig. 9 is a detail of the clutch and brake pedal mechanism.

Figs. 10 and 11 are details of the brake used with our tractor.

Fig. 12 is an enlarged diagrammatic view of a portion of the tread of one of our driving wheels with the detachable tread positioned thereon and also showing the auxiliary spurs.

Fig. 13 is a section on the line 13—13 of Fig. 12, partly in elevation.

Fig. 14 is a similar view on the line 14—14 of Fig. 12.

Figs. 15 and 16 are enlarged details of the draw bar mechanism used on the rear end of the machine.

Referring to the drawings, our tractor comprises a main frame composed of side members 5 and 6, rear end cross member 7, and intermediate cross member 8. Side members 5 and 6 are bent inwardly toward each other at their front ends and are secured upon either side of a front supporting member 9, by bolts or other means. Extending from cross member 8 to rear end cross member 7, and secured thereto, spaced apart equidistant from either side of the transverse center thereof are longitudinal brace members 10 and 11. Secured to the underside of side member 5 and brace member 10 at a distance from the rear end thereof are bearings 12 and 13 in which are mounted the ends of axle 14, and upon said axle between said side and brace members is mounted a driving wheel 15, suitable ball or roller bearings being provided between said wheel and axle to insure the free running of said wheel. A similar driving wheel 16, similarly equipped with bearings is mounted on axle 17, mounted at its ends in bearings 18 and 19, secured upon the under side of brace member 11 and side member 6 respectively. Secured to the inner side of wheels 15 and 16 and surrounding axles 14 and 17 are sprocket wheels 20 and 21, connected by sprocket chains 22 and 23 to sprocket wheels 24 and 25 loosely mounted upon a transmission shaft 26. Shaft 26 is loosely mounted in bearings 27, 28, 29 and 30 secured upon the upper sides of members 5, 10, 11 and 6 respectively. Loosely mounted upon shaft 26 and secured to the inner side of sprocket 24 is a clutch member 31, the outer surface of which forms a brake drum 32, and a clutch cone 33 is slidably but non-revolubly mounted upon shaft 26, adapted to normally engage clutch member 31 and lock the same to shaft 26. Clutch cone 33 is operated in the usual well known manner by fork 34 mounted upon an operating rod 35. Rod 35 is revolubly mounted in bearings 36 and 37 secured upon the outer side of brace member 10, and is provided near its rear end with an upwardly extending operating lever 38. A similar clutch and brake drum 39 is provided for sprocket 25, and a clutch cone 40, operated by an operating rod 35ª, fork 35ᵇ and lever 41 normally locks said sprocket to shaft 26. Coil spring 42, coiled around shaft 26, between clutch cone 33 and collar 43 on said shaft acts to normally hold said cone in operative contact with clutch member 31.

A similar spring 44 is provided for clutch cone 40. Rigidly secured upon shaft 26 between brace member 11 and clutch cone 40 are the transmission gears 45 and 46, respectively, gear 45 being the high speed gear and gear 46 being the low speed gear. Revolubly mounted in bearings 47, 48, 49 and 50, mounted upon the upper side of members 5, 10, 11, and 6 respectively is a driving shaft 51, upon which is slidably and non-revolubly mounted a sliding transmission member 52. Member 52 is provided at its outer end with a gear 53 adapted for engagement with gear 46, and at its other end with a gear 54 adapted for engagement with gear 45 to vary the speed of shaft 26.

Member 52 is operated by a fork 55 in the usual well known manner, which fork is mounted upon a shaft 56 revolubly supported in bearings 57 and 58. An operating lever 59 mounted upon shaft 56 near bearing 57 provides means for rotating said shaft. Loosely mounted on shaft 51 near the center thereof are bevel gears 60 and 61, the teeth of which are opposed and which mesh with bevel pinion 62 mounted on engine shaft 63 of engine 64.

Engine 64 is of any well known construction and is supported by and secured to supporting braces 65 and 66, secured at their ends to side members 5 and 6. Slidably but non-revolubly mounted on shaft 51 between gears 60 and 61 is a clutch member 67 provided with recesses 68 and 69 at each end thereof which recesses are adapted to engage teeth or lugs 70 and 71 in the opposed faces of bevel gears 60 and 61, to lock either one of said gears to shaft 51. Clutch member 67 is operated by a fork 72 in the usual manner, which fork is mounted upon operating rod 73, revolubly mounted at its ends in bearings 74 and 75. An operating lever 76 is mounted upon rod 73 near the end thereof and extends upwardly therefrom. Mounted upon the upper surface of member 8 at a distance from one end thereof is a bearing 77 in which is pivotally mounted one end of brake shoes 78 and 79, which shoes extend rearwardly a short distance and are then curved to surround brake drum 32, shoe 78 passing over the top of drum 32 and shoe 79 passing beneath said drum. Shoe 78 terminates in a head 80 a short distance above the median line of said drum and shoe 79 terminates in a head 81 a short distance below the median line of said drum. Connecting links 82 and 83 are pivotally mounted at their upper ends in head 80, one at each side thereof, by means of pintle bolt 84, and extend downwardly therefrom and have their lower ends slotted to receive the pivotal ends 85 and 85ª of a cam 86 mounted to oscillate between said links, the upper end of said cam being adapted to bear against the under side of head 81 and to move the same upwardly toward head 80 when the braking mechanism is operated. Cam 86 is provided with a downwardly extending arm 87, to the lower end of which is pivotally connected a yoke 88. The other end of yoke 88 is mounted upon one end of a brake rod 89 in screw threaded engagement therewith the other end of which rod extends rearwardly and has a similar yoke 90 mounted thereon. Yoke 90 is pivotally mounted upon the lower end of a rocking arm 91, which arm is rigidly mounted upon one end of a rocker shaft 91ª. Rocker shaft 91ª is pivotally mounted in bearings 92 and 93 mounted on the underside of members 10 and 11. A similar rocker arm 97 and connected parts is provided to operate shoes 98 and 99 of brake drum 39. Rigidly mounted on shaft 91ª centrally thereof is an upwardly extending rocker lever 100, on the rear face of the upper end of which is provided a cam face 101. Mounted at its ends in bearings 92 and 93 at the rear of and a little above shaft 91ª is a pedal shaft 102, centrally of which is rigidly mounted an upwardly extending pedal member 103. Extending downwardly from pedal member 103 is a cam member 104, preferably integral therewith, which is adapted to contact with cam face 101 to rock lever 100 when the pedal is oscillated in either direction. Depending downwardly from rocker shaft 91ª intermediate the ends thereof adjacent the outer side of bearing 93 is a rocker arm 105 to the lower end of which is pivotally connected a yoke 106 mounted upon the rear end of a clutch rod 107. The other end of rod 107 is connected to the clutch yoke 108 of clutch 109 mounted on the engine shaft 63.

Yoke 108 is mounted and operated in the usual well known manner. A coil spring 111 is mounted between heads 80 and 81 of brake shoes 78 and 79 to normally hold said shoes in their most open position, out of contact with the brake drum.

Secured upon the under side of cross member 8 are reversible downwardly extending draw hooks 112 of any desired number. These hooks are of such shape that they may have their position upon said cross member reversed so as to draw a plow or other tool when the tractor is traveling in either direction.

Near the sides of supporting member 9 are provided vertically extending bearings 113 and 114 in which are revolubly mounted the vertical axles 116 and 117 respectively of caster wheels 118 and 119. Extending from each side of bearings 113 and 114 longitudinally of the tractor are bifurcated ears 120 and 121 in which are pivotally mounted the ends of shafts 122 and 123, and rigidly mounted on these shafts within the furcations of members 120 and 121 are mounted downwardly depending locking levers 124 and 125, adapted to be received in the recesses 126 and 127 in the upper portion of the forks which carry caster wheels 118 and 119 to prevent the rotation thereof on their vertical axes as hereafter explained. Rigidly mounted upon shaft 122, centrally thereof, is a forwardly and upwardly extending lever 128 adapted to contact with the upper surface of a similar lever 129 rigidly mounted upon shaft 123 whereby, when shaft 122 is rocked, lever 128 will depress the end of lever 129 and rotate rock shaft 123 as hereafter explained. Extending rearwardly from each end of shaft 122 are elevating levers 130 and 131 and mounted upon the front ends of operating rods 35 and 35ª are trip levers 132 and 133, which, when said operating rods are rotated, elevate the ends of levers 130 and 131 thereby rocking shaft 122. Mounted upon the upper face of rear end member 7, centrally thereof, is a bracket 134 in which is provided a socket 135 and a similar bracket 136 is mounted upon a cross member 137 extending from brace members 10 and 11. In these sockets is adapted to be received the lower end of a flexible seat or saddle support 138 having a seat or saddle 139 mounted upon the upper end thereof. As best shown in Figs. 4, 15 and 16, rear end member 7 is U-shaped in cross section and forms a track 140 in which is slidably mounted a drawbar 141. Clips 142 are provided to prevent said bar from accidentally coming out of said track.

Extending vertically through bar 141 are a plurality of equally spaced holes or apertures 143 which are adapted to register with similarly spaced apertures 144 and 145 in end member 7 and in these apertures are adapted to be received retaining pins 146 to hold said bar against longitudinal movement. Mounted upon the periphery of the driving wheels are auxiliary treads for use when the tractor is being used for agricultural work and are removed when it is desired to use the tractor for road work. These treads are preferably made in four sections but may be made in any preferred number of sections. Each section is composed of side bars 147 and 148, and center bar 149 bent to fit the periphery of the wheels. Mounted at equally spaced intervals along bar 149 are a plurality of long tread bars 150, secured thereto centrally of their length by rivets 151 or other means which are of a length to reach substantially to the longitudinal center of bars 147 and 148 and are secured thereto by rivets 152 or any other desired means, thus connecting bars 147 and 148 to bar 149. Secured at equally spaced intervals along bars 147 and 148, alternating with treads 150 of bar 149 are a plurality of short treads 153 by rivets 154 or other means.

These treads and bars have formed therein at suitable intervals a plurality of sockets 155 having enlarged recesses 156 at the inner ends thereof in which are adapted to be mounted the auxiliary spurs 157 having heads 158, which heads are adapted to be mounted in the enlarged recesses to prevent accidental displacement. Extending forwardly from the front end of supporting member 9 is a guide member 159 in which is provided a guideway 160 extending transversely of the tractor, and in this guideway is slidably mounted a front drawbar 161 similar to rear drawbar 141, and it is provided with pins 162 to hold the same against accidental displacement. It will be noticed that we have shown the tread bars as being recessed or undercut for the reception of the side and center bars as we prefer this construction, but we do not limit or confine ourselves to this construction. It will be noticed that yoke 90 is slotted as best shown in Fig. 4, so that by moving the foot pedal forward a short distance the clutch will be opened and the power cut off and that a further forward movement will apply the brakes and prevent the travel of the tractor. In starting the tractor this movement will be reversed, the brakes being first released and the clutch then closed. It will also be particularly noticed that owing to the construction of our control pedal a movement thereof either forward or reverse will accomplish the same result so that by changing the location of the seat from that shown in the drawings to the exact reverse by mounting the end of the seat support in bracket 137, the tractor can be driven backward and controlled as easily as in forward running. If desired a cover of sheet metal may be provided to inclose the operating parts of the tractor.

In the operation of our tractor running forward the parts will be as shown in the drawings. Lever 76 will be moved to the right to cause clutch 67 to lock bevel gear 60 to shaft 51.

The engine will then be started in the usual manner. The operator will then press forward upon pedal member 103 to open clutch 109 of the engine. He will then move lever 59 to the right to cause the low speed gears to mesh and will then release foot pedal 103. This last operation will be repeated should he desire to shift into the high speed excepting that he will move lever 59 to the extreme left which will cause the high speed gears to mesh. When it is desired to reverse the direction of travel the engine clutch will be disconnected in the usual manner with the foot pedal and lever 76 will be moved toward the left thus releasing gear 60 and locking gear 61 to shaft 51. In running in a straight line when it is desired to turn in either direction to the right or left the operator will disconnect the driving wheel on the side toward which it is desired to turn by moving either of the levers 38 or 41, according to the direction in which it is desired to turn, inwardly toward himself. This disconnects the driving wheel on that side from the transmission shaft and at the same time rocks the shafts carried by member 9 to withdraw locking levers 124 and 125 from recesses 126 and 127 of caster wheels 118 and 119 which wheels are then free to turn in any direction.

When it is desired to proceed with the caster wheels at the rear of the machine instead of at the front said wheels will be reversed and locked in their reversed position and the seat support will be withdrawn from bracket 134 and placed in bracket 136 in a reversed position when the machine may be operated exactly as in forward running. Suitable ball or anti-friction bearings may be provided wherever necessary to provide protection against excessive friction.

Having described our invention what we claim is:

1. A tractor comprising a substantially rectangular frame narrowed at its front end; a pair of tractor wheels independently mounted at the rear end of said frame, one at each side thereof; a pair of caster wheels mounted at the front end of said frame, each of said wheels being mounted independently of the other wheel and being capable of movement horizontally; an explosion engine mounted in said frame longitudinally thereof and having a crank shaft; a power shaft; a clutch connecting said crank and power shafts; a bevel pinion on the end of said power shaft; a drive shaft extending from side to side of said frame at a right angle to said power shaft; a pair of bevel gears loosely mounted on said drive shaft in mesh with said bevel pinion on opposite sides thereof; a clutch slidably but non-revolubly mounted on said drive shaft between said bevel gears adapted to lock either of said gears to said shaft; means to operate said clutch; a transmission member slidably but non-revolubly mounted on said drive shaft near one end thereof; a gear mounted on each end of said transmission member, one of said gears being of a larger diameter than the other; a transmission shaft mounted in said frame parallel with and adjacent to said drive shaft; a pair of gears rigidly mounted on said transmission shaft in a plane passing between the gears on the transmission member, said gears being of different diameters in reverse order to the gears of the transmission member whereby the smaller gear on one shaft will mesh with the larger gear on the other shaft; means to cause either pair of said gears to mesh; sprocket wheels secured to the inner sides of said driving wheels; sprocket wheels on said transmission shaft mounted loosely thereon in alinement with said driving wheel sprockets; a sprocket chain connecting said pairs of sprocket wheels; clutch members on said transmission shaft at the side of the sprocket wheels adapted to lock said sprocket wheels to said shaft; means to operate said last clutch members; means to lock said caster wheels against movement horizontally; means to release said locking means; a brake drum on the outer periphery of said clutch members; brake shoes for said drum adapted to frictionally engage the same at predetermined times; and means to simultaneously operate said brake shoes and engine clutch.

2. A tractor comprising a substantially rectangular frame narrowed at its front end; a pair of driving wheels revolubly mounted independently of each other at the rear end of said frame one at each side thereof; a pair of caster wheels mounted at the front end of said frame, each of said wheels being mounted independently of the other wheel and being capable of movement horizontally; means to lock said caster wheels against horizontal movement; means to release said locking means; an explosion engine mounted in said frame longitudinally thereof intermediate the ends, and having a crank shaft; a driving shaft mounted transversely in said frame; a transmission shaft mounted in said frame parallel with and adjacent to said driving shaft; a power shaft; a clutch connection between said crank and power shaft; means to operate said clutch connection; a bevel gear on the end of said power shaft; a pair of bevel gears on said driving shaft mounted loosely thereon in mesh with the gear on the end of the power shaft; means to lock either one of said driving shaft gears to said shaft; means to operate said locking means; sliding gears on said driving shaft of different diameters; stationary gears on said transmission shaft of different diameters, said last gears being mounted in reverse order to the sliding gears and being so proportioned as to form pairs with the gears on the power shaft whereby the ratio of revolution of the two shafts is varied; means to cause the different pairs of gears to mesh; independent connections from said transmission shaft to each of said driving wheels adapted to cause said wheels to rotate; independent means to release said connections; a friction brake for each of said driving wheels; means to operate said friction brakes simultaneously with said engine clutch whereby when said clutch is released the brakes are applied.

3. A tractor comprising a substantially rectangular frame narrowed at one end; a pair of driving wheels revolubly mounted at each side of the rear end of said frame; a pair of caster wheels mounted one at each side of the narrowed end of said frame, said wheels being mounted independently of each other and being capable of movement horizontally; means to lock said caster wheels against horizontal movement; a power plant mounted in said frame intermediate the ends thereof; a driving shaft; a connection from said power plant to said driving shaft adapted to rotate said driving shaft in either direction; a transmission shaft parallel with said driving shaft; means connecting said driving and transmission shafts adapted to impart different ratios of relative rotation therebetween; connections from said transmission shaft to said driving wheels adapted to transmit rotation thereto; means to disconnect either of said driving wheels from said transmission shaft and to release the locking means of the caster wheels synchronously; braking means for each of said wheels; and means to disconnect said power plant from said driving shaft.

4. A tractor comprising a substantially rectangular frame narrowed at one end; a pair of driving wheels revolubly mounted at each side of the rear end of said frame; a pair of caster wheels mounted one at each side of said narrowed end of said frame, said last wheels being mounted independently of each other and being capable of movement horizontally; means to lock said caster wheels against horizontal movement; an explosion engine mounted in said frame intermediate the ends and longitudinally thereof, having a crank shaft; a power shaft; a connection from said crank shaft to said power shaft adapted to lock said shafts together; a driving shaft; a connection from said power to said driving shaft adapted to rotate said driving shaft in one direction; a connection from said power shaft to said driving shaft adapted to rotate said driving shaft in a reverse direction; means to operatively connect either one of said last connections to the driving shaft whereby said shaft is rotated in the desired direction; a transmission shaft parallel with said driving shaft and adjacent thereto; an adjustable connection between said driving and transmission shaft adapted to be adjusted to impart varying ratios of relative rotation thereto, or to permit independent rotation of said driving shaft; a connection from said transmission shaft to each of said driving wheels adapted to transmit power thereto; means to release said last connections; a connection from said releasing means to the locking means of the caster wheels whereby when said releasing means are operated said caster wheel locking mechanism will be released;

5. A tractor comprising a substantially rectangular frame; a pair of driving wheels revolubly mounted, one at each side, at one end of said frame; a pair of caster wheels mounted, one at each side, at the other end of said frame, said caster wheels being independently mounted as to each other and being capable of movement around a vertical axis; means to lock said caster wheels against movement around said axis; an engine mounted in said frame having a crank shaft; a power shaft; a connection between said crank and power shafts adapted to lock the same together; means to release said last means; a driving shaft; adjustable connections between said power and driving shafts whereby said shaft may be rotated in either direction; means to operate said adjustable connections to rotate said driving shaft in the desired direction; a transmission shaft; means connecting said driving and transmission shafts adapted to be adjusted to impart varying ratios of relative rotation between said shafts; means to adjust said last means; a connection between said transmission shaft and each of said driving wheels adapted to be locked to said shaft to impart rotation to said driving wheels; means to lock or unlock said last connections and to lock or unlock the caster locking means in unison; and braking means for said driving wheels adapted to be operated by said power shaft releasing means.

6. In a vehicle a pair of independently driven driving wheels; means to impart power thereto; a pair of independently mounted caster wheels mounted to turn around a vertical axis; means to lock said caster wheels against movement around said axis; and means to release either one of said driving wheels and to unlock said caster locking means in unison.

In witness that we claim the foregoing we have hereunto subscribed our names this 14th day of June 1917.

ANDREW K. MARTELL.
EMIL MONHOF.